(12) United States Patent
Kim et al.

(10) Patent No.: US 11,489,954 B2
(45) Date of Patent: Nov. 1, 2022

(54) VEHICULAR ELECTRONIC DEVICE AND OPERATION METHOD THEREOF

(71) Applicant: LG Electronics Inc., Seoul (KR)

(72) Inventors: Donghwa Kim, Seoul (KR); Eunkyung Noh, Seoul (KR); Iljin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 245 days.

(21) Appl. No.: 16/500,240

(22) PCT Filed: Apr. 30, 2019

(86) PCT No.: PCT/KR2019/005221
§ 371 (c)(1),
(2) Date: Oct. 2, 2019

(87) PCT Pub. No.: WO2020/222333
PCT Pub. Date: Nov. 5, 2020

(65) Prior Publication Data
US 2021/0329116 A1 Oct. 21, 2021

(51) Int. Cl.
| H04M 1/60 | (2006.01) |
| B60W 60/00 | (2020.01) |
| H04M 1/72439 | (2021.01) |
| B60W 40/08 | (2012.01) |
| H04N 7/15 | (2006.01) |

(52) U.S. Cl.
CPC .......... *H04M 1/6041* (2013.01); *B60W 40/08* (2013.01); *B60W 60/0051* (2020.02); *H04M 1/72439* (2021.01); *H04N 7/15* (2013.01); *B60W 2040/089* (2013.01); *B60W 2540/21* (2020.02); *B60W 2540/225* (2020.02)

(58) Field of Classification Search
CPC .......... H04M 1/6041; H04M 1/72439; B60W 40/08; B60W 40/083; B60W 60/0051; B60W 60/00; B60W 2040/089; B60W 2540/21; B60W 2540/225; H04N 7/15; H04N 7/156
See application file for complete search history.

(56) References Cited

U.S. PATENT DOCUMENTS

2014/0160228 A1* 6/2014 Jeong ..................... H04N 7/147
348/14.12
2017/0289772 A1* 10/2017 Kim .................. B60W 50/0097

FOREIGN PATENT DOCUMENTS

| KR | 1020140075068 | 6/2014 |
| KR | 101776750 | 9/2017 |
| KR | 1020180026243 | * 3/2018 |

OTHER PUBLICATIONS

Korean Office Action in Korean Application No. 10-2019-7024849, dated Jun. 23, 2020, 12 pages (with English translation).

* cited by examiner

*Primary Examiner* — Yuwen Pan
*Assistant Examiner* — Angelica M Perez
(74) *Attorney, Agent, or Firm* — Fish & Richardson P.C.

(57) ABSTRACT

Disclosed is a vehicular electronic device including a processor configured to receive information on a user gaze direction, to determine whether a user looks forward based on the information, to perform control to make a call using voice only upon determining that the user looks forward, and to perform control to make a call using voice and an image upon determining that the user does not look forward.

15 Claims, 25 Drawing Sheets

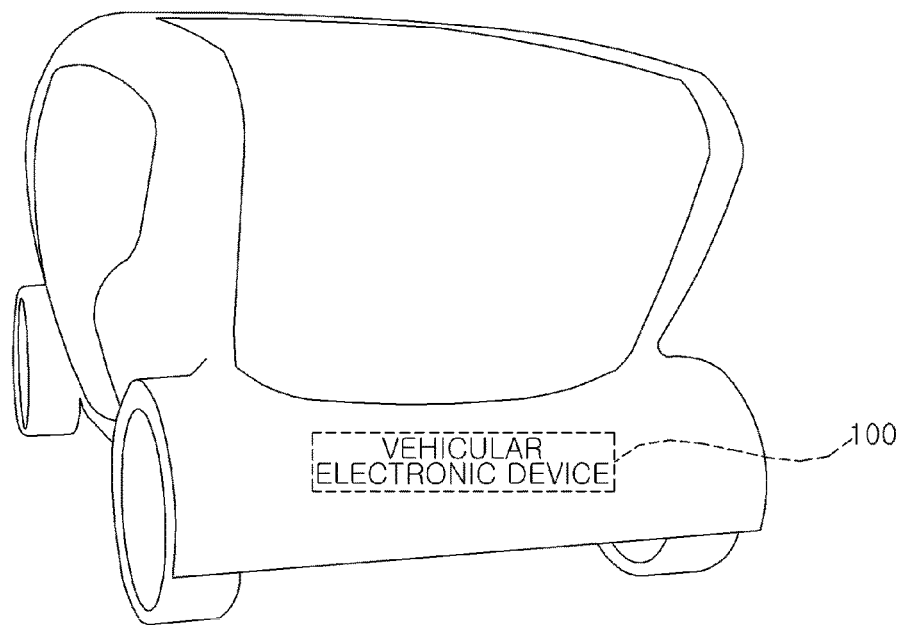
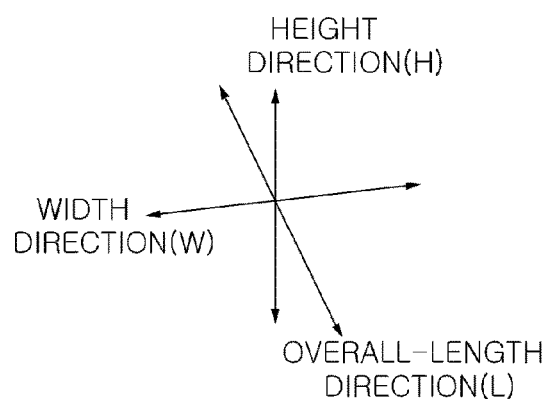
FIG.1

FIG. 6a
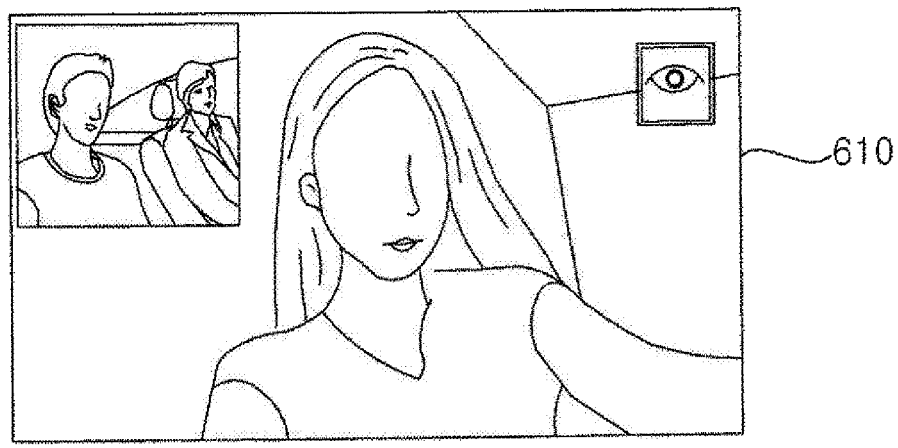
  

FIG. 8b
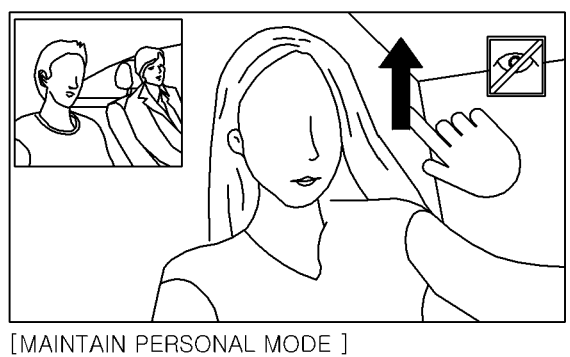
[MAINTAIN PERSONAL MODE]
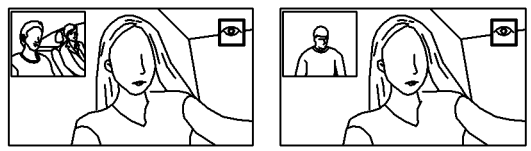
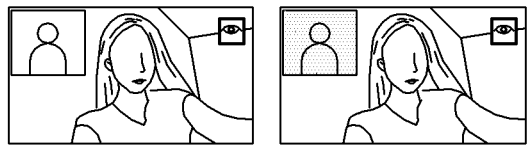
[MAINTAIN OPEN MODE]

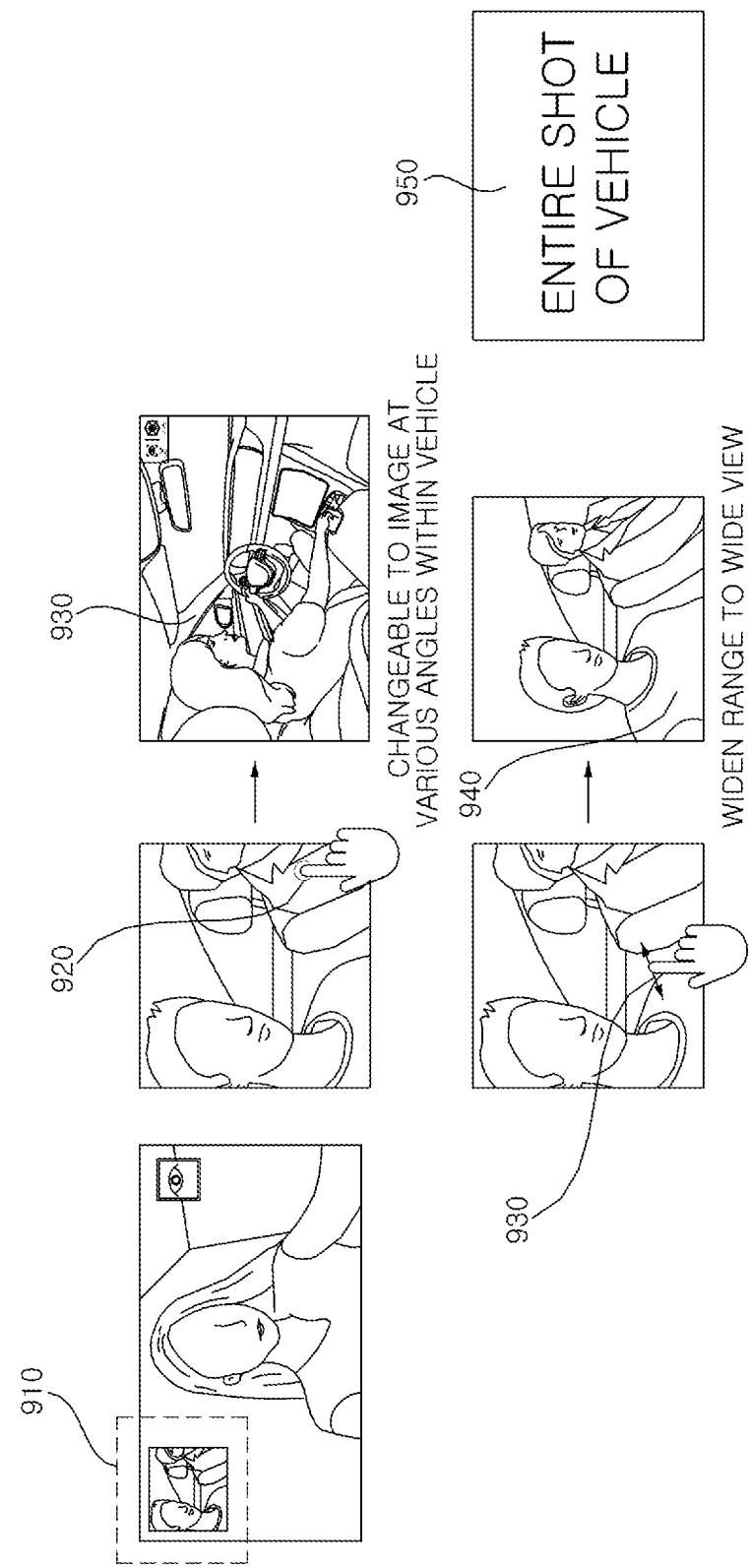

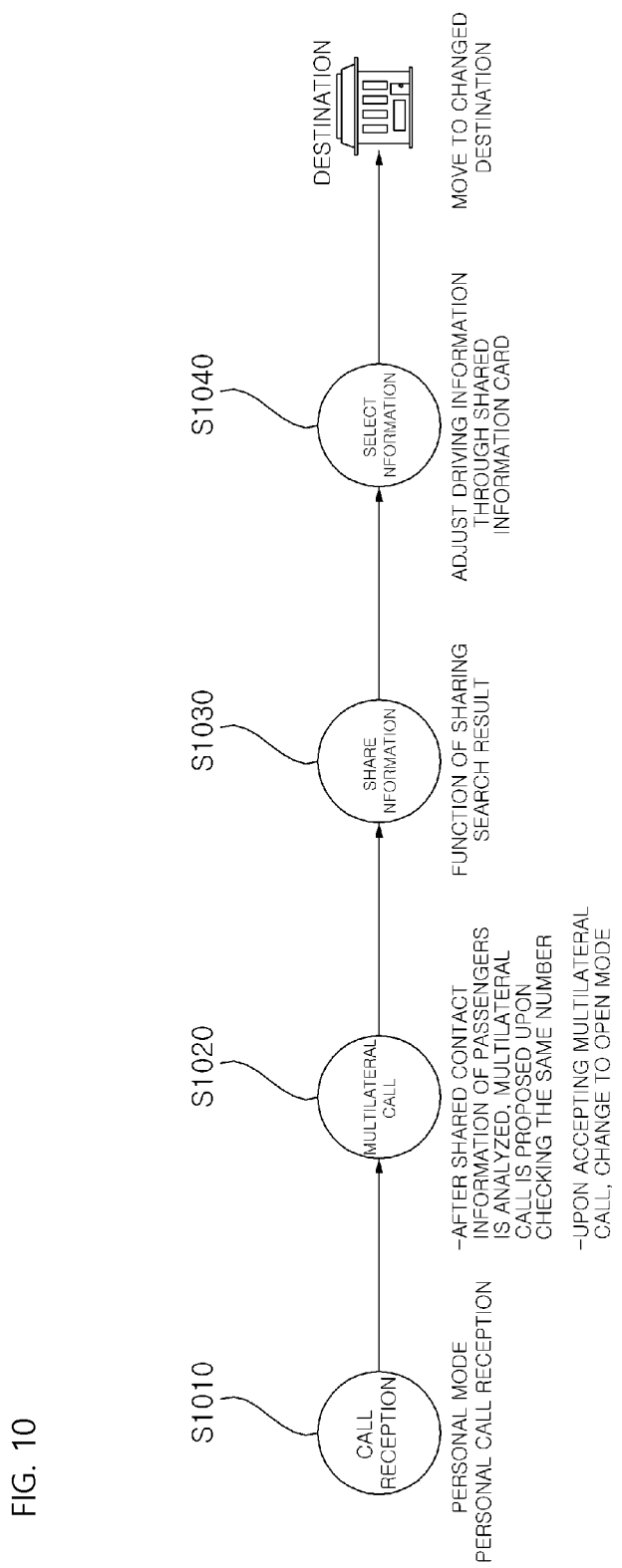

FIG. 13a
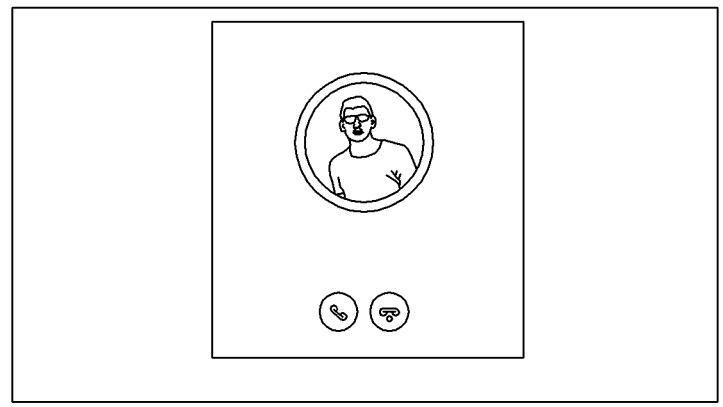
RECEIVE CALL OF REQUEST FOR
EXTERNAL VIDEO CONFERENCE
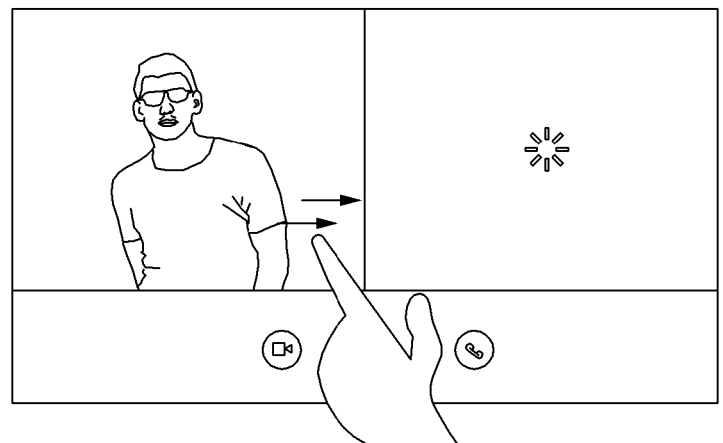
SHARE CONFERENCE WITH PASSENGER
OF SIDE SEAT THROUGH SWIPE OPERATION FIG. 13b
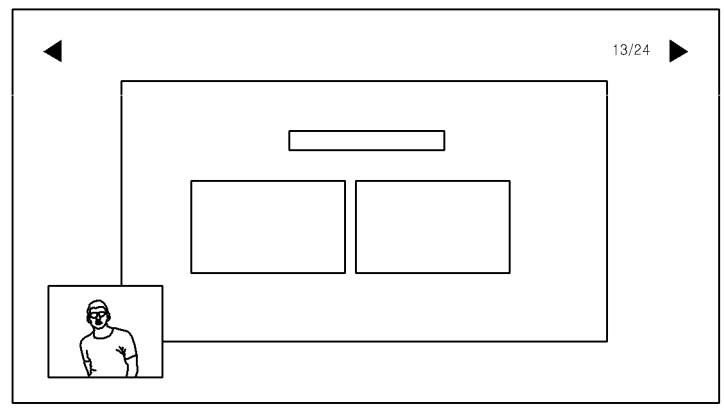
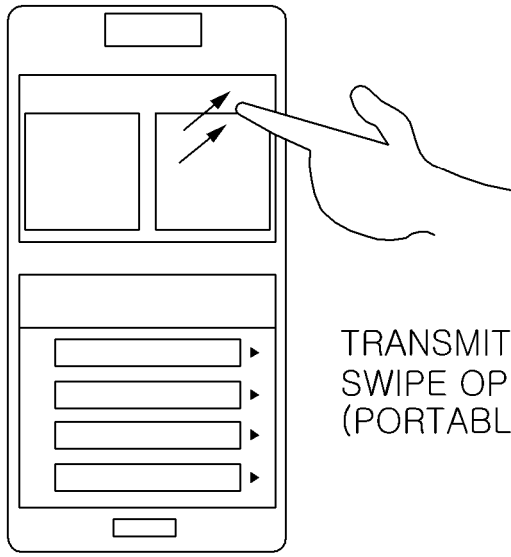
TRANSMIT SHARING MATERIAL THROUGH SWIPE OPERATION OF PORTABLE DEVICE (PORTABLE PHONE)

FIG. 13c
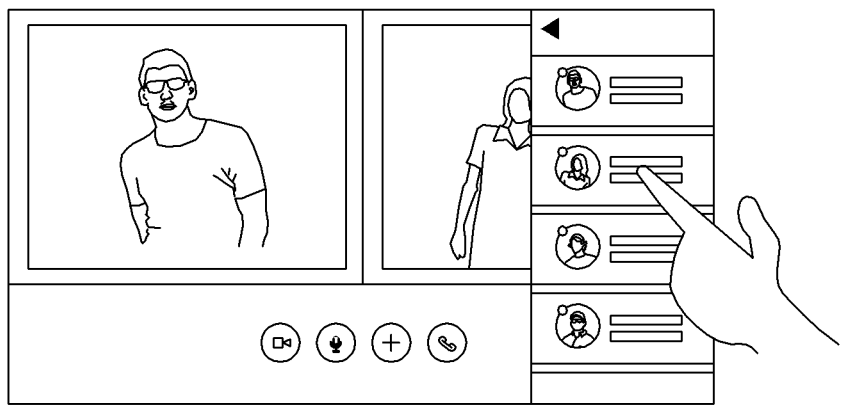
PARTICIPANT LIST IMAGE ON/OFF.
DISPLAY ONLINE/OFFLINE/SHARING STATE
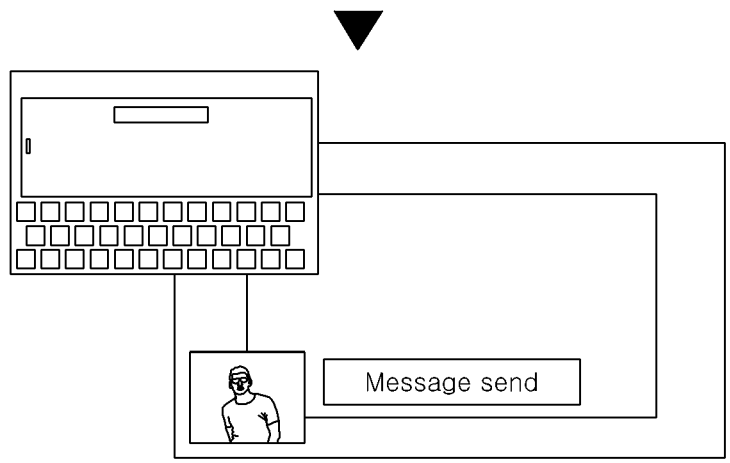
AFTER TARGET IS SELECTED VIA LONG TAP
ON PARTICIPANT LIST, MESSAGE IS TRANSMITTED
TO PORTABLE PHONE.

FIG. 15a
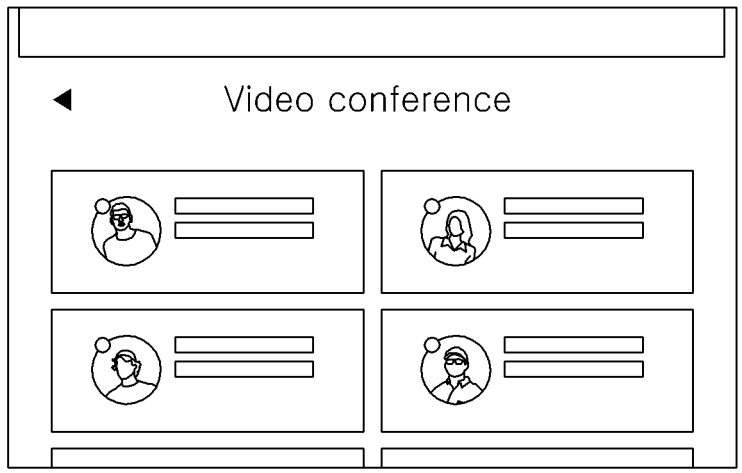
DISPLAY ONLINE/OFFLINE/MOBILE ACCESS /SHARING STATE
ESTABLISH PARTICIPANT LIST
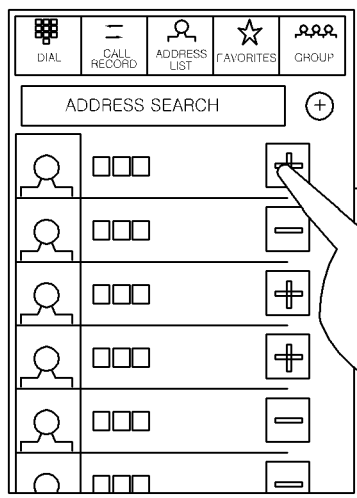
ADD AFTER SELECT PARTICIPANT OF CONFERENCE IN ADDRESS LIST OF PORTABLE PHONE

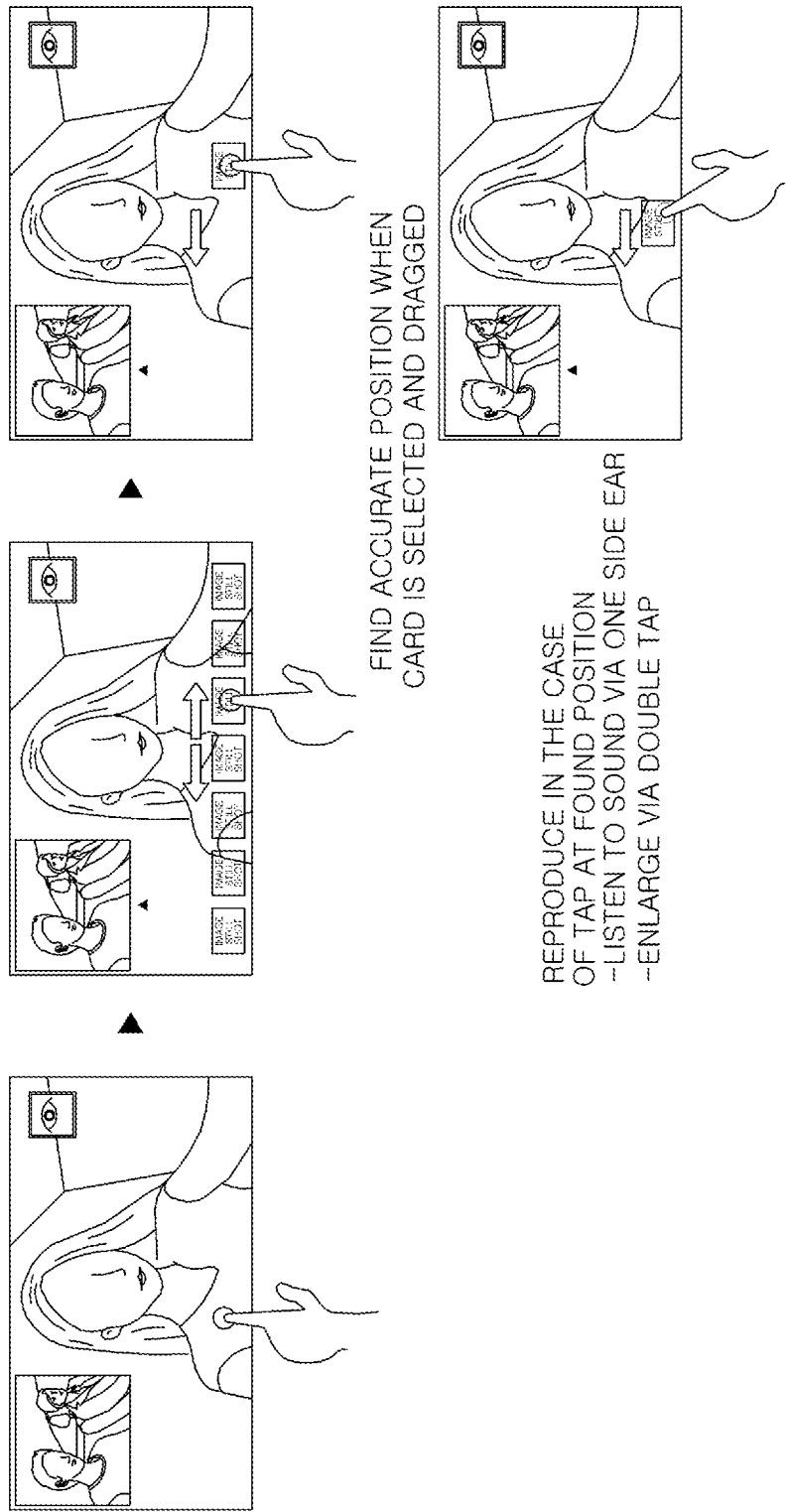

FIG. 17a
[RIDE ALONE]
- SET TO PERSONAL MODE ONLY
  AND THERE IS NO MODE CONVERSION
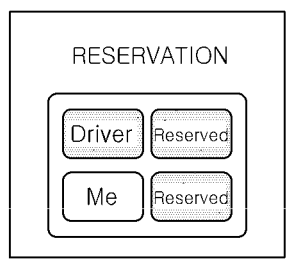
MOBILE RESERVATION IMAGE

FIG. 17b
[RIDE WITH PASSENGER ]
- DEFAULT SETTING TO PERSONAL MODE
- POSSIBLE TO SHARE CALL WITH PASSENGER
  THROUGH MODE CONVERSION BUTTON
  OR SWIPE OPERATIO
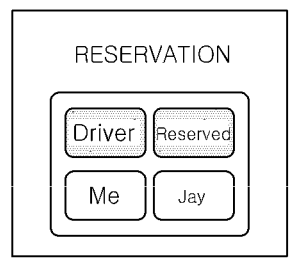
MOBILE RESERVATION IMAGE

VEHICULAR ELECTRONIC DEVICE AND OPERATION METHOD THEREOF

CROSS-REFERENCE TO RELATED APPLICATION

This application is a National Stage application under 35 U.S.C. § 371 of International Application No. PCT/KR2019/005221, filed Apr. 30, 2019, which is incorporated by reference.

TECHNICAL FIELD

The present invention relates to a vehicular electronic device and an operation method thereof.

BACKGROUND ART

A vehicle is an apparatus that is moved in a desired direction by a user who rides therein. A representative example of a vehicle is an automobile. An autonomous vehicle is a vehicle that autonomously travels without driving manipulation of a human. A passenger of an autonomous vehicle is free of driving, and thus a video telephony function may be provided to a user during traveling. However, the autonomous vehicle is manually driven depending on the cases, and thus video telephony needs to be limited during manual driving.

Recently, sharing autonomous vehicles have also been seen in the field. Unspecified individuals may ride in a sharing autonomous vehicle, and thus there is a problem in terms of invasion of privacy in video telephony.

DISCLOSURE

Technical Problem

It is an object of the present invention to provide a vehicular electronic device for limiting a video telephony function depending on the cases in an autonomous vehicle.

It is another object of the present invention to provide an operation method of a vehicular electronic device for limiting a video telephony function depending on the cases in an autonomous vehicle.

The technical problems solved by the embodiments are not limited to the above technical problems, and other technical problems which are not described herein will become apparent to those skilled in the art from the following description.

Technical Solution

In accordance with the present invention, the above and other objects can be accomplished by the provision of a vehicular electronic device including a processor configured to receive information on a user gaze direction, to determine whether a user looks forward based on the information, to perform control to make a call using voice only upon determining that the user looks forward, and to perform control to make a call using voice and an image upon determining that the user does not look forward.

In accordance with another aspect of the present invention, there is provided an operation method of a vehicular electronic device, including receiving information on a user gaze direction, by at least one processor, determining whether a user looks forward based on the information, by the at least one processor, upon determining that the user looks forward, performing control to make a call using voice only, and upon determining that the user does not look forward, performing control to make a call using voice and an image.

Details of other embodiments are included in a detailed description and drawings.

Advantageous Effects

According to the above technical solution, the present invention may provide one or more of the following effects.

First, some functions of video telephony may be limited depending on the cases in an autonomous vehicle, thereby achieving safe driving.

Second, an image may be processed depending on the cases in an autonomous vehicle and may be provided to a counterpart, and thus privacy of other passengers except for a call participant may not be invaded.

Third, user experience (UX) for multilateral call of a plurality of passengers may be provided, thereby enhancing user convenience.

The effects of the present invention are not limited to the above-described effects and other effects which are not described herein may be derived by those skilled in the art from the following description of the embodiments of the disclosure.

DESCRIPTION OF DRAWINGS

FIG. 1 is a diagram showing an outer appearance of a vehicle according to an embodiment of the present invention.

FIGS. 6A to 19 are diagrams for explanation of an operation of an electronic device according to an embodiment of the present invention.

BEST MODE

Reference will now be made in detail to the exemplary embodiments of the present invention, examples of which are illustrated in the accompanying drawings. The suffixes "module" and "unit" of elements herein are used for convenience of description and thus can be used interchangeably, and do not have any distinguishable meanings or functions. In the following description of the at least one embodiment, a detailed description of known functions and configurations incorporated herein will be omitted for the purpose of clarity and for brevity. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

It will be understood that, although the terms "first", "second", "third" etc. may be used herein to describe various elements, these elements should not be limited by these terms. These terms are only used to distinguish one element from another element.

It will be understood that when an element is referred to as being "on", "connected to" or "coupled to" another element, it may be directly on, connected or coupled to the other element, or intervening elements may be present. In contrast, when an element is referred to as being "directly on," "directly connected to" or "directly coupled to" another element or layer, there are no intervening elements present.

The singular expressions in the present specification include the plural expressions unless clearly specified otherwise in context.

It will be further understood that the terms "comprises" or "comprising" when used in this specification specify the presence of stated features, integers, steps, operations, elements, or components, but do not preclude the presence or addition of one or more other features, integers, steps, operations, elements, components, or groups thereof.

FIG. 1 is a diagram showing a vehicle according to an embodiment of the present invention.

Referring to FIG. 1, a vehicle 10 according to an embodiment of the present invention may be defined as a transportation device that travels on a road or a railroad. The vehicle 10 may conceptually include an automobile, a train, and a motorcycle. The vehicle 10 may include a vehicle equipped with an internal combustion engine as a power source, a hybrid vehicle equipped with both an engine and an electric motor as a power source, and an electric vehicle equipped with an electric motor as a power source. The vehicle 10 may be a sharing vehicle. The vehicle 10 may be an autonomous vehicle.

The vehicle 10 may include an electronic device 100. The electronic device 100 may be a device for implementing video telephony in the vehicle 10.

Figure 2:
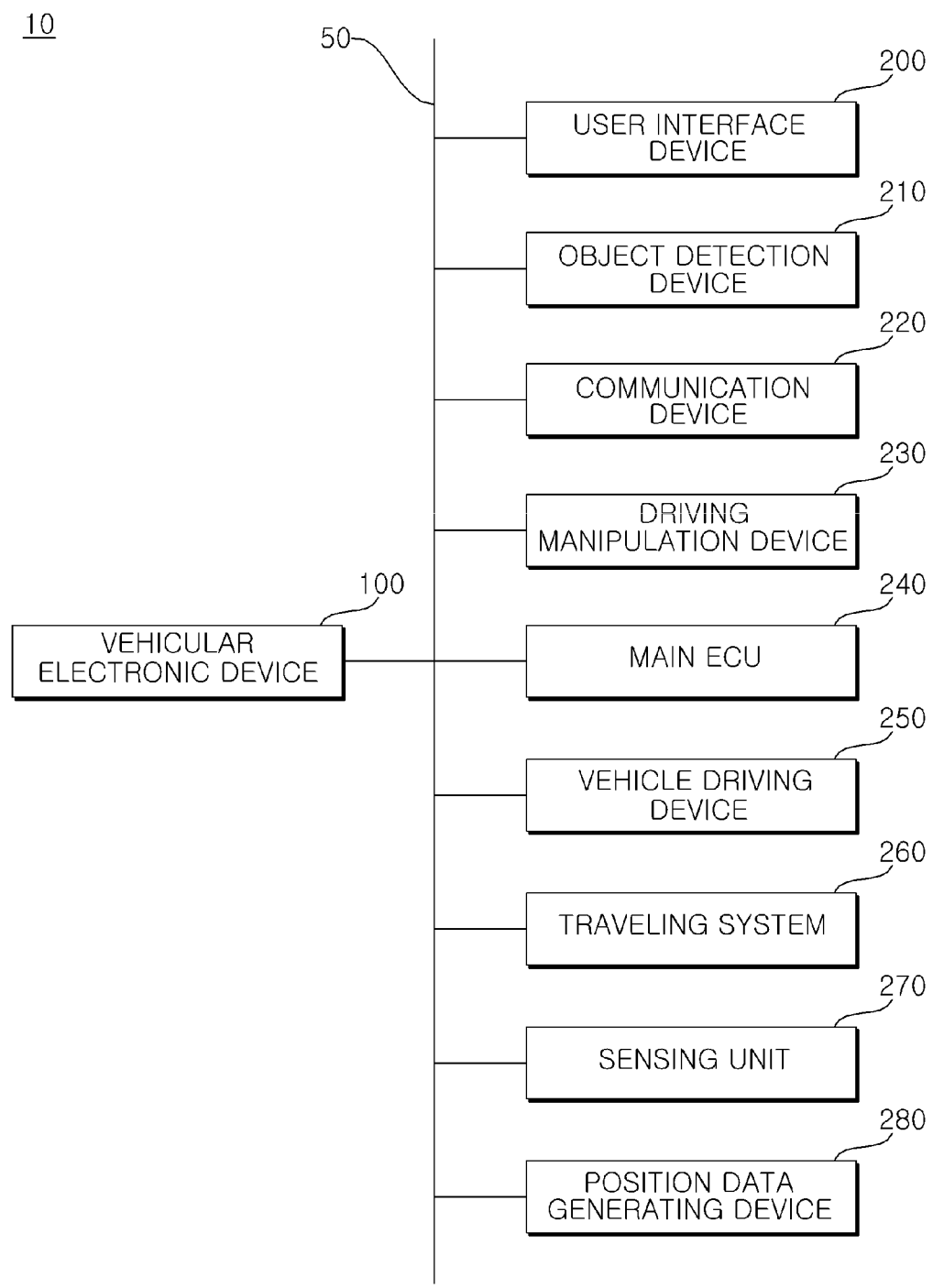
FIG. 2 is a control block diagram of a vehicle according to an embodiment of the present invention.

FIG. 2 is a control block diagram of a vehicle according to an embodiment of the present invention.

Referring to FIG. 2, the vehicle 10 may include the vehicular electronic device 100, a user interface device 200, an object detection device 210, a communication device 220, a driving manipulation device 230, a main electronic control unit (ECU) 240, a vehicle driving device 250, a traveling system 260, a sensing unit 270, and a position data generating device 280.

The vehicular electronic device 100 may perform a video telephony operation. The vehicular electronic device 100 may perform the video telephony operation using a communication device inside the vehicle 10. The vehicular electronic device 100 may perform the video telephony operation through a terminal that carried by a passenger. In this case, a microphone, a speaker, and a display included in the vehicle 10 may be used. The microphone, the speaker, and the display included in the vehicle 10 may be a low-ranking component of the user interface device 200.

The UI device 200 may be used to enable the vehicle 10 to communicate with a user. The UI device 200 may receive user input, and may provide information generated by the vehicle 10 to the user. The vehicle 10 may implement a UI or User Experience (UX) through the UI device 200.

The object detection device 210 may detect an object outside the vehicle 10. The object detection device 210 may include at least one of a camera, radio detecting and ranging (radar), light detection and ranging (LiDAR), an ultrasonic sensor, or an infrared sensor. The object detection device 210 may provide data of an object, which is generated based on a sensing signal generated by a sensor, to at least one electronic device included in a vehicle.

The communication device 220 may exchange a signal with a device positioned outside the vehicle 10. The communication device 220 may exchange a signal with at least one of an infrastructure element (e.g., a server or a broadcast station) or other vehicles. The communication device 220 may include at least one of a transmission antenna, a reception antenna, a radio frequency (RF) circuit for implementing various communication protocols, or an RF device for performing communication.

The driving manipulation device 230 may be used to receive a user command for driving the vehicle 10. In the manual mode, the vehicle 10 may travel based on a signal provided by the driving manipulation device 230. The driving manipulation device 230 may include a steering input device (e.g., a steering wheel), an acceleration input device (e.g., an acceleration pedal), and a brake input device (e.g., a brake pedal).

The main ECU 240 may control an overall operation of at least one electronic device included inside the vehicle 10.

The vehicle driving device 250 is a device for electrically controlling various devices inside the vehicle 10. The vehicle driving device 250 may include a powertrain driving unit, a chassis driving unit, a door/window driving unit, a safety device driving unit, a lamp driving unit, and an air conditioner driving unit. The powertrain driving unit may include a power source driver and a transmission driver. The chassis driving unit may include a steering driver, a brake driver, and a suspension driver.

The safety device driving unit may include a seatbelt driver for control of a seatbelt.

An advanced driver assistance system (ADAS) 260 may generate a signal for controlling the movement of the vehicle 10 or for outputting information to a user, based on the data of the object, which is received from the object detection device 210. The ADAS 260 may provide the generated signal to at least one of the user interface device 200, the main ECU 240, or the vehicle driving device 250.

The ADAS 260 may implement at least one of an adaptive cruise control (ACC) system, an autonomous emergency braking (AEB) system, a forward collision warning (FCW) system, a lane keeping assist (LKA) system, a lane change assist (LCA) system, a target following assist (TFA) system, a blind spot detection (BSD) system, a high beam assist (HBA) system, an auto parking system (APS), a PD collision warning system, a traffic sign recognition (TSR) system, a traffic sign assist (TSA) system, a night vision (NV) system, a driver status monitoring (DSM) system, or a traffic jam assist (TJA) system.

The sensing unit 270 may sense a vehicle state. The sensing unit 270 may include at least one of an inertial navigation unit (IMU) sensor, a collision sensor, a wheel sensor, a speed sensor, an inclination sensor, a weight detection sensor, a heading sensor, a position module, a vehicle drive/reverse sensor, a battery sensor, a fuel sensor, a tire sensor, a steering sensor for rotation of the steering wheel, an in-vehicle temperature sensor, an in-vehicle humidity sensor, an ultrasonic sensor, an illuminance sensor, an acceleration pedal position sensor, or a brake pedal position sensor. The inertial navigation unit (IMU) sensor may include one or more of an acceleration sensor, a gyro sensor, and a magnetic sensor.

The sensing unit 270 may generate state data of a vehicle based on a signal generated by at least one sensor. The sensing unit 270 may acquire a sensing signal of vehicle position information, vehicle motion information, vehicle yaw information, vehicle roll information, vehicle pitch information, vehicle collision information, vehicle heading information, vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, the pressure applied to an accelerator pedal, the pressure applied to a brake pedal, and so on.

The sensing unit 270 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 270 may generate vehicle state information based on the sensing data. The vehicle state information may be generated based on data detected by various sensors included in the vehicle.

For example, the vehicle state information may include vehicle position information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and so on.

The sensing unit may include a tension sensor. The tension sensor may generate a sensing signal based on a tension state of a seatbelt.

The position data generating device 280 may generate position data of the vehicle 10. The position data generating device 280 may include at least one of a global positioning system (GPS) or a differential global positioning system (DGPS). The position data generating device 280 may generate position data of the vehicle 10 based on a signal generated by at least one of a GPS or a DGPS. In some embodiments, the position data generating device 280 may correct the position data based on at least one of an inertial measurement unit (IMU) of the sensing unit 270 or a camera of the object detection device 210.

The vehicle 10 may include an internal communication system 50. A plurality of electronic devices included in the vehicle 10 may exchange signals using the internal communication system 50 as a medium. The signals may include data. The internal communication system 50 may use at least one communication protocol (e.g., CAN, LIN, FlexRay, MOST, or Ethernet).

Figure 3:
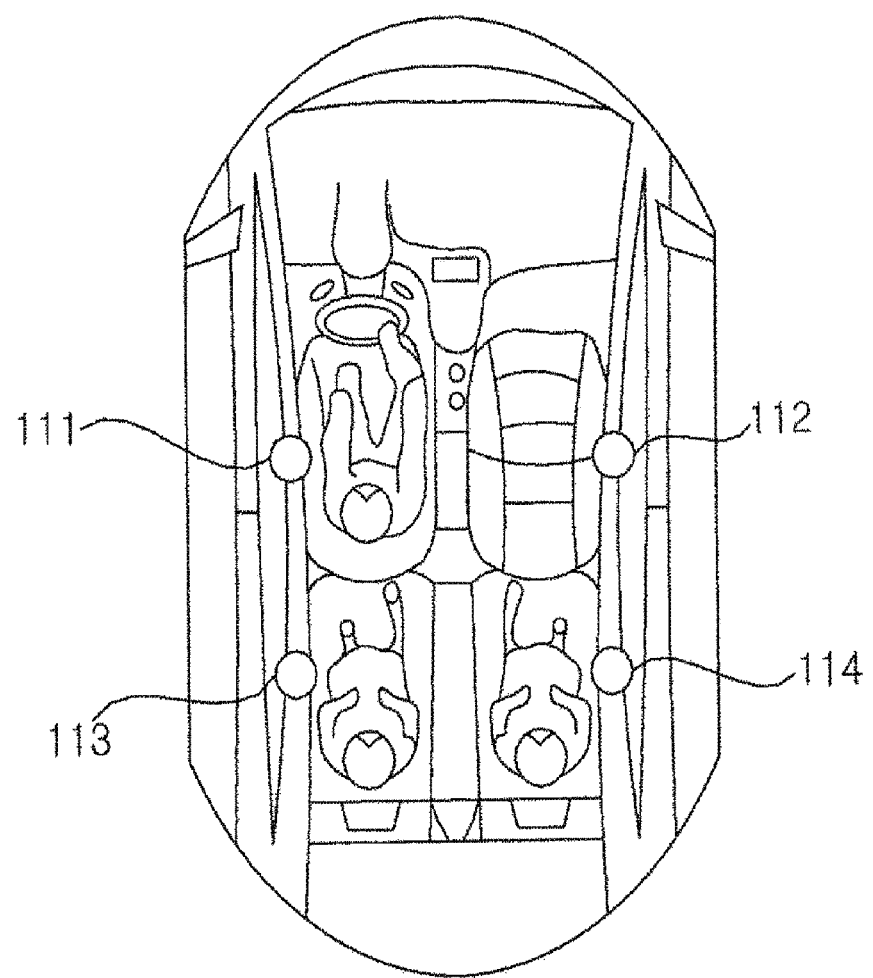
FIG. 3 is a diagram showing a passenger compartment of a vehicle according to an embodiment of the present invention.

FIG. 3 is a diagram showing a passenger compartment of a vehicle according to an embodiment of the present invention.

Figure 4:
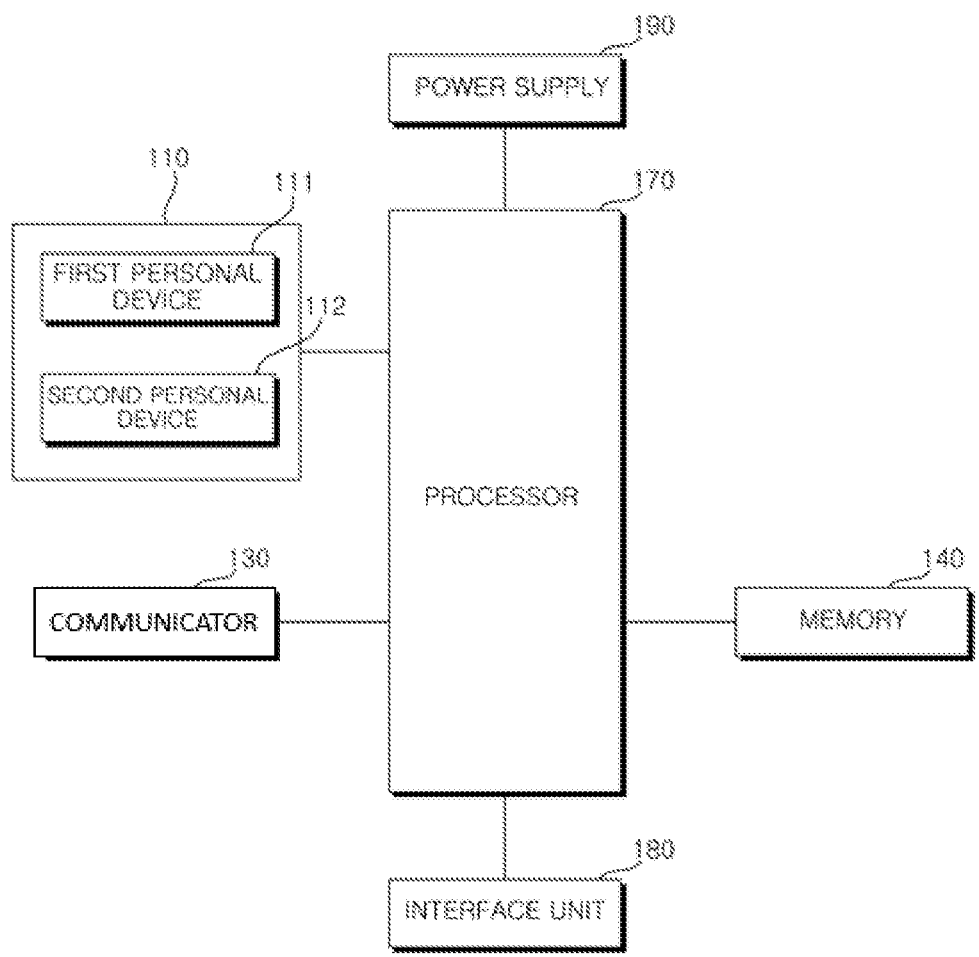
FIG. 4 is a control block diagram of an electronic device according to an embodiment of the present invention.

FIG. 4 is a control block diagram of an electronic device according to an embodiment of the present invention.

Referring to FIGS. 3 and 4, the electronic device 100 may include a memory 140, a processor 170, an interface unit 180, and a power supply 190. The electronic device 100 may further separately include a plurality of personal devices 110 and a communicator 130 or may further include a combination thereof.

The personal devices 110 may be allocated to respective seats and may interface with users. The personal devices 110 may be configured in plural number. The personal devices 110 may include a first personal device 111 allocated to a first seat and a second personal device 112 allocated to a second seat. In some embodiments, the personal device 110 may further include a third personal device 113 allocated to a third seat and a fourth personal device 114 allocated to a fourth seat.

Each of the personal devices 110 may include a microphone, a speaker, a camera, and a display. A user may do video telephony with a counterpart using the personal device 110 allocated to the user. The user may do video telephony with a counterpart using a microphone, a speaker, a camera, and a display. In some embodiments, the user may do video telephony with a counterpart using a communication device included in the vehicle 10. In some embodiments, the user may use a communication device included in a terminal carried by the user, in which case the microphone, the speaker, the camera, and the display included in the vehicle 10 may be used to do video telephony with a counterpart.

Each of the personal devices 110 may further include an input unit. The input unit may convert at least one of touch input, gesture input, or mechanical input of the user to an electrical signal and may provide the electrical signal to a processor 170.

The communicator 130 may exchange signals with a user terminal. For example, the communicator 130 may form a communication channel with the user terminal using a short-distance communication protocol. To this end, the communicator 130 may include at least one of a radio frequency (RF) circuit, or an RF device.

The memory 140 may be electrically connected to the processor 170. The memory 140 may store basic data of a predetermined unit, control data for control of an operation of a predetermined unit, and input and output data. The memory 140 may store data processed by the processor 170. The memory 140 may include at least one of a read-only memory (ROM), random-access memory (RAM), erasable programmable read only memory (EPROM), flash drive, or hard drive in terms of hardware. The memory 140 may store various data for an overall operation of the electronic device 100, such as a program for processing or controlling the processor 170. The memory 140 may be integrated into the processor 170. In some embodiments, the memory 140 may be classified as a lower-ranking component of the processor 170.

The interface unit 180 may exchange a signal in a wired or wireless manner with at least one electronic device included in the vehicle 10. The interface unit 180 may exchange a signal in a wired or wireless manner with at least one of the object detection device 210, the communication device 220, the driving manipulation device 230, the main ECU 240, the vehicle driving device 250, the ADAS 260, the sensing unit 270 or the position data generating device 280. The interface unit 180 may include at least one of a communication module, a terminal, a pin, a cable, a port, a circuit, an element, or a device.

The interface unit 180 may receive position data of the vehicle 10 from the position data generating device 280. The interface unit 180 may receive traveling speed data from the sensing unit 270. The interface unit 180 may receive data of an object around a vehicle from the object detection device 210.

When the personal device 110 and the communicator 130 are not classified as a low-ranking component of the vehicular electronic device 100, the interface unit 180 may function as a path for connecting the processor 170 with the personal device 110 and the communicator 130.

The power supply 190 may supply power to the electronic device 100. The power supply 190 may receive power from a power source (e.g., a battery) included in the vehicle 10 and may supply power to each unit of the electronic device

100. The power supply 190 may be operated according to a control signal provided from the main ECU 240. The power supply 190 may be embodied as a switched-mode power supply (SMPS).

The processor 170 may be electrically connected to the memory 140, the interface unit 180, and the power supply 190 and may exchange a signal therewith. The processor 170 may be electrically connected to a microphone 101, an emergency communication device 102, a camera 130, and a speaker 103 and may exchange a signal therewith. The processor 170 may be embodied using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing other functions. The processor 170 may be operated in a state in which power is supplied from a power supply 190.

The processor 170 may receive information on a user gaze direction. The processor 170 may receive information on a user gaze direction from the camera included in the vehicle 10.

The processor 170 may determine whether the user looks forward based on the information on the user gaze direction. The processor 170 may determine whether the user looks forward using a predetermined tracking algorithm.

Upon determining that the user looks forward, the processor 170 may perform control to make a call using voice only. Upon determining that the user does not look forward, the processor 170 may perform control to make a call using voice and an image. The processor 170 may limit video telephony based on whether the user looks forward in a manual driving mode. By virtue of such a control operation, the probability of traffic accidents occurring may be reduced.

The processor 170 may receive driving mode information. The processor 170 may receive autonomous driving mode information. The processor 170 may receive manual driving mode information. The processor 170 may receive information on conversion to a manual driving mode from an autonomous driving mode. The processor 170 may receive information on conversion to the autonomous driving mode from the manual driving mode.

The processor 170 may perform control to make a call using voice only for a stand-by time for conversion to the autonomous driving mode from the manual driving mode. During conversion to the autonomous driving mode from the manual driving mode, the conversion stand-by time may be present. The conversion stand-by time may be defined as a time taken to a time point at which the current mode is actually converted to the autonomous driving mode after a conversion trigger signal to autonomous driving is generated. The processor 170 may generate a control signal to output information on the conversion stand-by time.

The processor 170 may perform control to make a call using voice and an image after conversion to the autonomous driving mode from the manual driving mode is completed. The processor 170 may generate a control signal to output information on a time at which a call using voice and an image is enabled, in the form of countdown, in a stand-by state.

The processor 170 may receive information on an autonomous driving level. An autonomous driving state of the autonomous vehicle may be labeled with a plurality of levels. For example, level 0 may be defined as a stage in which automation is not performed and a driver needs to completely control a vehicle. Level 1 may be defined a stage in which steering, acceleration and deceleration, or the like is automated to help the driver in a state in which an electronic device assists the driver. Level 2 may be defined as a stage in which the driver is capable of recognizing a vehicle and a lane and an interval with a forward vehicle is capable of being maintained, but the driver needs to look a surrounding situation, in a state in which partial autonomous driving is enabled. Level 3 may be defined as a state in which autonomous driving is enabled in a predetermined section but a driver needs to look a surrounding situation to prepare for an emergency situation, in a state in which conditional autonomous driving is enabled. Level 4 may be defined as a stage in which whole safety control is enabled in a specific road condition in an advanced autonomous driving state. Level 5 may be defined as a stage in which all functions such as parking are completely automated to a destination without driver intervention, in a complete autonomous driving state. In level 5, a driver is not required.

The processor 170 may display a front image of a vehicle with an image of a telephone according to the received information on the autonomous driving level. The processor 170 may display the front image including a larger amount of information as the autonomous driving level is lowered.

When a signal for conversion to the manual driving mode from the autonomous driving mode is generated, the processor 170 may perform control to make a call using voice only. When a trigger signal for conversion to the manual driving mode is generated, the processor 170 may perform control to immediately make a call for only voice even before the current mode is converted to the manual driving mode.

The processor 170 may perform control to make a call using voice only or a call using voice and an image based on a signal received from a terminal. When a user terminal receives a call signal, the processor 170 may perform control to make a call in synchronization with the terminal. When a call signal is generated from the user terminal, the processor 170 may perform control to make a call in synchronization with the terminal.

A plurality of users may ride in the vehicle 10. For example, first and second users may ride in the vehicle 10. The first user may carry a first terminal. The second user may carry a second terminal. The processor 170 may receive a first call signal transmitted from a terminal of a counterpart from the first terminal of the first user. The processor 170 may receive the second call signal transmitted from the terminal of the counterpart from the second terminal of the second user. Upon receiving the first call signal transmitted from the terminal of the counterpart from the first terminal of the first user and receiving the second call signal transmitted from the terminal of the counterpart from the second terminal of the second user, the processor 170 may perform control to make a multilateral call including the first and second users.

The processor 170 may activate the first personal device 111 closest to the first terminal that receives the first signal through the communicator 130 among the plurality of personal devices 110 included in the vehicle 10. The processor 170 may acquire position information of the first terminal within the vehicle 10 based on intensity of a signal generated by the first terminal. The processor 170 may determine the first personal device closest to the first terminal based on position information of the first terminal.

Upon determining that a telephone number included in the first signal is stored in the second terminal, the processor 170 may further activate the second personal device 112 closest to the second terminal. The processor 170 may determine whether multilateral video telephony is performed, based on whether a common telephone number is stored in a plurality of terminals.

The processor 170 may perform image-processing on an image transmitted to the counterpart based on whether a corresponding call is in a personal mode or an open mode. According to user settings, the personal mode or the open mode of the call may be determined. The personal mode or the open mode of the call may be determined depending on whether a multilateral call including a plurality of passengers within the vehicle 10 is performed.

When a call is in a personal mode, the processor 170 may crop or blur the remaining part except for an utterer in an image transmitted to the counterpart.

Upon receiving a call join request signal, the processor 170 may inactivate existing cropping or blurring. Upon receiving the call join request signal, the processor 170 may activate the camera, the speaker, and the microphone of an apparatus that generates the call join request signal.

The electronic device 100 may include at least one printed circuit board (PCB). The electronic device 110, the communicator 130, the memory 140, the interface unit 180, the power supply 190, and the processor 170 may be electrically connected to the PCB.

Figure 5:
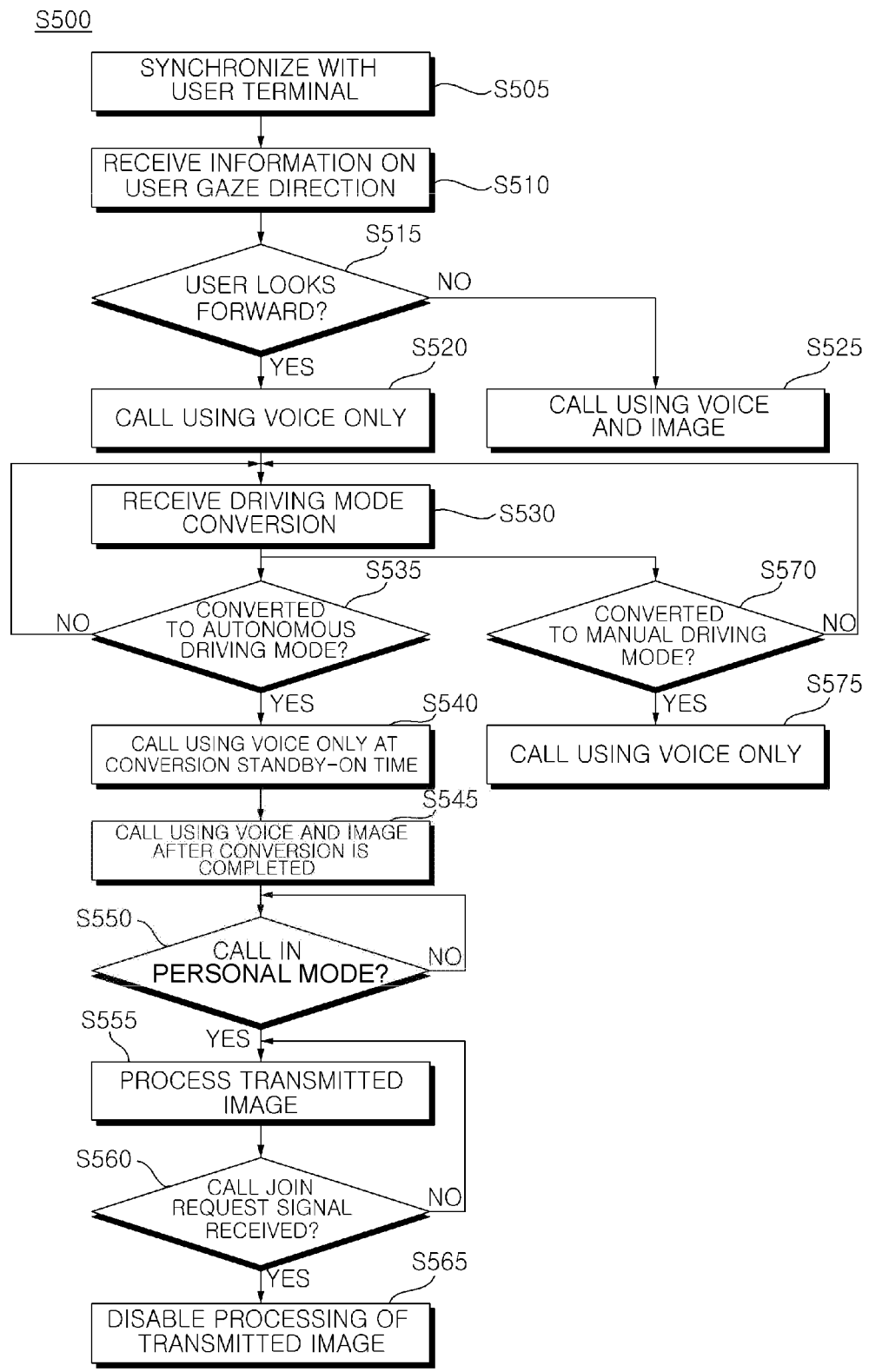
FIG. 5 is a flowchart of an electronic device according to an embodiment of the present invention.

FIG. 5 is a flowchart of an electronic device according to an embodiment of the present invention. FIG. 5 illustrates operations of an operation method S500 of the electronic device 10 included in the vehicle 10.

Referring to FIG. 5, the processor 170 may be synchronized with a user terminal (S505). The processor 170 may receive information on a user gaze direction (S510). The processor 170 may determine whether the user looks forward based on the information on the user gaze direction (S515).

Upon determining that the user looks forward, the processor 170 may perform control to make a call using voice only (S520). When the user looks forward, the processor 170 may determine that the user is concentrated on traveling of the vehicle 10 and may limit video telephony not to interrupt the user.

Upon determining that the user does not look forward, the processor 170 may perform control to make a call using voice and an image (S525). When the user does not look forward, the processor 170 may determine that the user is not concentrated on traveling of the vehicle 10 and may provide a video telephony function to a user. Operation S525 may include enabling a first personal device closest to the first terminal that receives a first signal through the communicator 130 among a plurality of personal devices included in a vehicle, by at least one processor 170. Operation S525 may further include further enabling a second personal device closest to a second terminal upon determining that a telephone number included in the first signal is stored in the second terminal, by the at least one processor 170.

The processor 170 may receive driving mode conversion mode (S530). The processor 170 may receive information on conversion to the autonomous driving mode from the manual driving mode. The processor 170 may receive information on conversion to the manual driving mode from the autonomous driving mode.

Upon receiving a signal of conversion to the autonomous driving mode from the manual driving mode (S535), the processor 170 may perform control to make a call using voice only at a conversion stand-by time to the autonomous driving mode from the manual driving mode (S540). Then, the processor 170 may perform control to make a call using voice and an image after conversion to the autonomous driving mode from the manual driving mode is completed (S545).

Upon receiving a signal of conversion to the manual driving mode from the autonomous driving mode (S570), the processor 170 may perform control to make a call using voice only (S575).

The operation method S500 of the electronic device may further include displaying a front image of a vehicle with a telephone image according to the received autonomous driving level information, in which case the front image including a larger amount of information is displayed as the autonomous driving level is lowered, by the at least one processor 170, between operations S535 and S545.

The processor 170 may perform image-processing on an image transmitted to the counterpart (S555) based on whether a corresponding call is in a personal mode or an open mode (S550). For example, operation S555 of performing image-processing (S555) may include cropping or blurring the remaining part except for an utterer in an image transmitted to the counterpart when a predetermined call is in a personal mode.

The operation method S500 of the electronic device may further include disabling cropping or blurring (S565) upon receiving a call join request signal (S560) by the at least one processor 170. The operation method S500 of the electronic device may further include enabling the camera, the speaker, and the microphone of an apparatus that generates the call join request signal upon receiving the call join request signal (S560) by the at least one processor 170.

FIGS. 6A to 18 are diagrams for explanation of an operation of an electronic device according to an embodiment of the present invention.

FIGS. 6A to 9 are diagrams for explanation of an operation for video telephony according to an embodiment of the present invention.

Figure 6B:
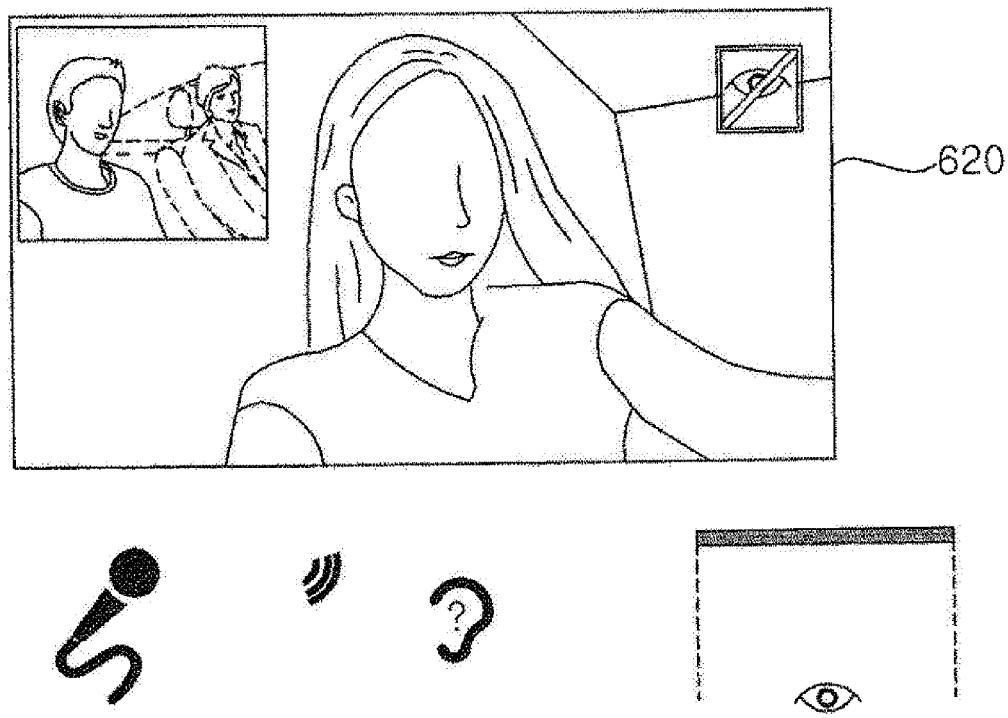

Referring to FIGS. 6A to 6B, the electronic device 100 may set a video telephony mode according to a situation and use intention. FIG. 6A illustrates an example of an open mode of video telephony and FIG. 6B illustrates an example of a personal mode of video telephony. Control processing in the open mode and the personal mode may be performed by the processor 170.

In the open mode, the microphone, the speaker, and the camera may be used without any limit. The personal mode may be used when privacy needs to be protected. In the personal mode, the processor 170 may recognize voice of only a subject of conversation and may noise-process the remaining sound except for the voice of the subject of conversation using a directional microphone. In the personal mode, the processor 170 may preclude other people except for the subject of conversation from listening to a telephone conversation using a directional speaker. In the personal mode, the processor 170 may process an image acquired through a camera and may blur an image except for the subject of the conversation to block information input. In the personal mode, the processor 170 may allow only the subject of conversation to see an image displayed on a display and may preclude other people from seeing the image. For example, the processor 170 may use a switchable display.

Reference numeral 610 is an example of an image displayed on a display in an open mode, and reference numeral 620 is an example of an image displayed on the display in a personal mode. It may be seen that, in the personal mode, one region of an image of a passenger compartment of a vehicle may blur.

Figure 7:
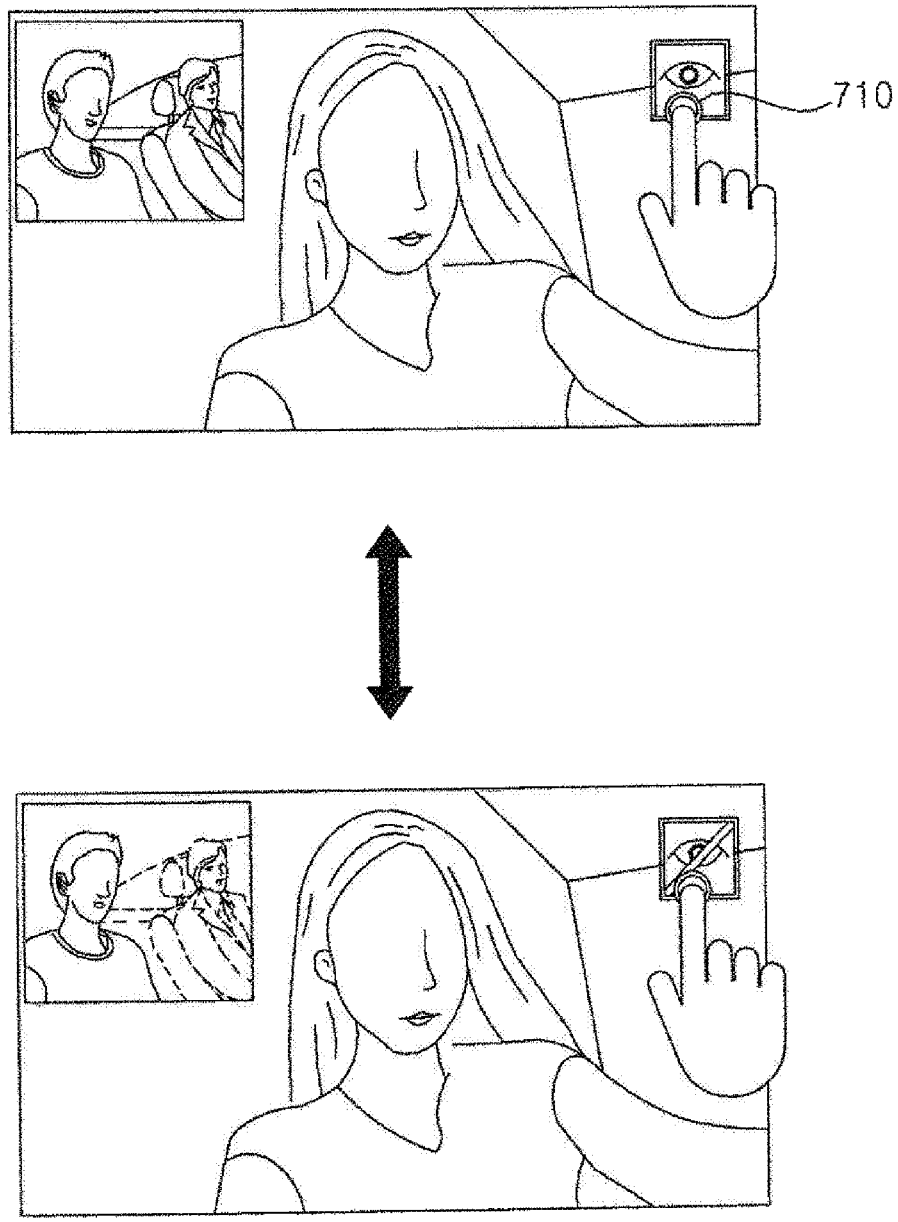

Referring to FIG. 7, the processor 170 may switch between the open mode and the personal mode based on user input. As shown in FIG. 7, an input signal may be generated according to manipulation of a toggle button displayed on a display. Upon receiving an input signal using the toggle button in the open mode, the processor 170 may be converted to the personal mode. Upon receiving an input signal using the toggle button in the personal mode, the processor 170 may be converted to the open mode.

Figure 8A:
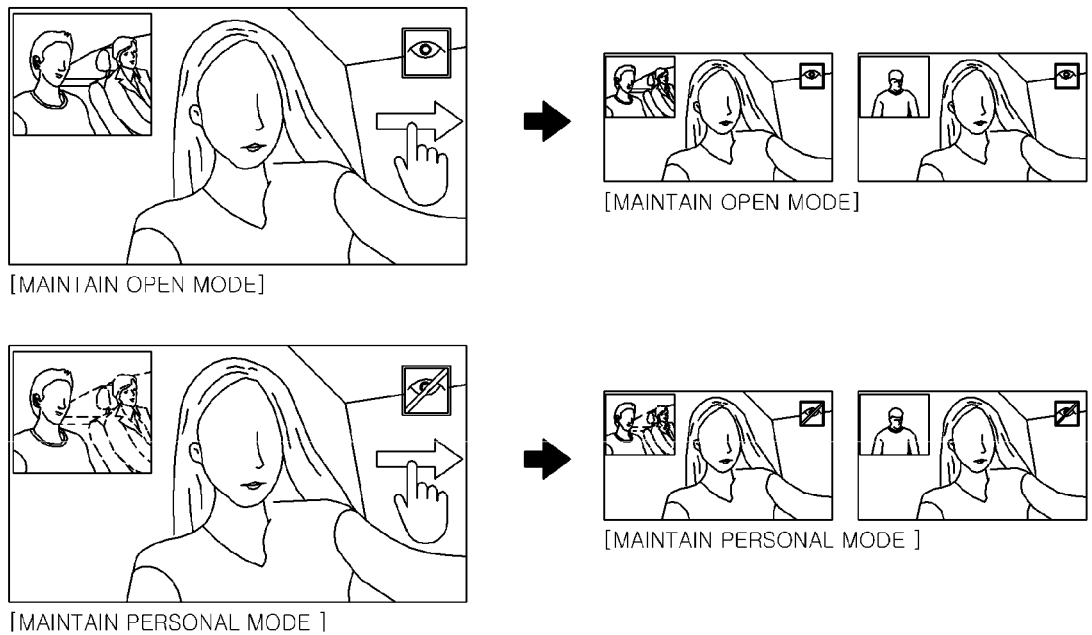

Referring to FIGS. 8A and 8B, the processor 170 may share video telephony based on user input. As shown in FIG. 8A, the processor 170 may receive swipe input in left and right directions of the display. In this case, the processor 170 may transmit a video telephony sharing request signal to a personal device of a side seat. Upon receiving a response signal from the personal device of the side seat, the processor 170 may share video telephony with the personal device of the side seat. The processor 170 may share video telephony with the personal device of the side seat while a video telephony mode (an open mode or a personal mode) is maintained. As shown in FIG. 8B, the processor 170 may receive swipe input in up and down directions of the display. In this case, the processor 170 may transmit a video telephony sharing request signal to all personal devices. Upon receiving a response signal from all or some of personal devices, the processor 170 may share video telephony with a personal device that transmits a signal. In the open mode, the processor 170 may share video telephony while the open mode is maintained. In the personal mode, the processor 170 may be converted to the open mode and may share video telephony.

In some embodiments, swipe input in up and down directions of the display may be limited to users, contact information of which is shared, and may be used as input of sharing video telephony.

Referring to FIG. 9, the processor 170 may adjust a view point of an image 910 transmitted to a terminal of a counterpart based on user input. The user may adjust information of a transmitted image according to user intention during video telephony.

The processor 170 may receive a signal based on drag input 920. In this case, the processor 170 may adjust an angle of an image according to a drag direction. The processor 170 may display a direction moving queue on an image.

The processor 170 may receive a signal based on long touch input (press input, or touch hold input). In this case, the processor 170 may move an image in a direction toward a region in which touch is performed.

The processor 170 may receive first pinch in input 930. In this case, the processor 170 may convert a personal view image to a wide view image. Then, the processor 170 may receive second pinch in input. In this case, the processor 170 may convert the wide view image to an entire view image of an internal part of a cabin. When an image is converted to the wide view image or the entire view image, a camera for cabin monitoring other than a camera included in a personal device may be further used.

The processor 170 may receive first pinch out input. In this case, the processor 170 may convert the entire view image to the wide view image. Then, the processor 170 may receive second pinch out input. In this case, the processor 170 may convert the wide view image to the personal view image.

Figure 11:
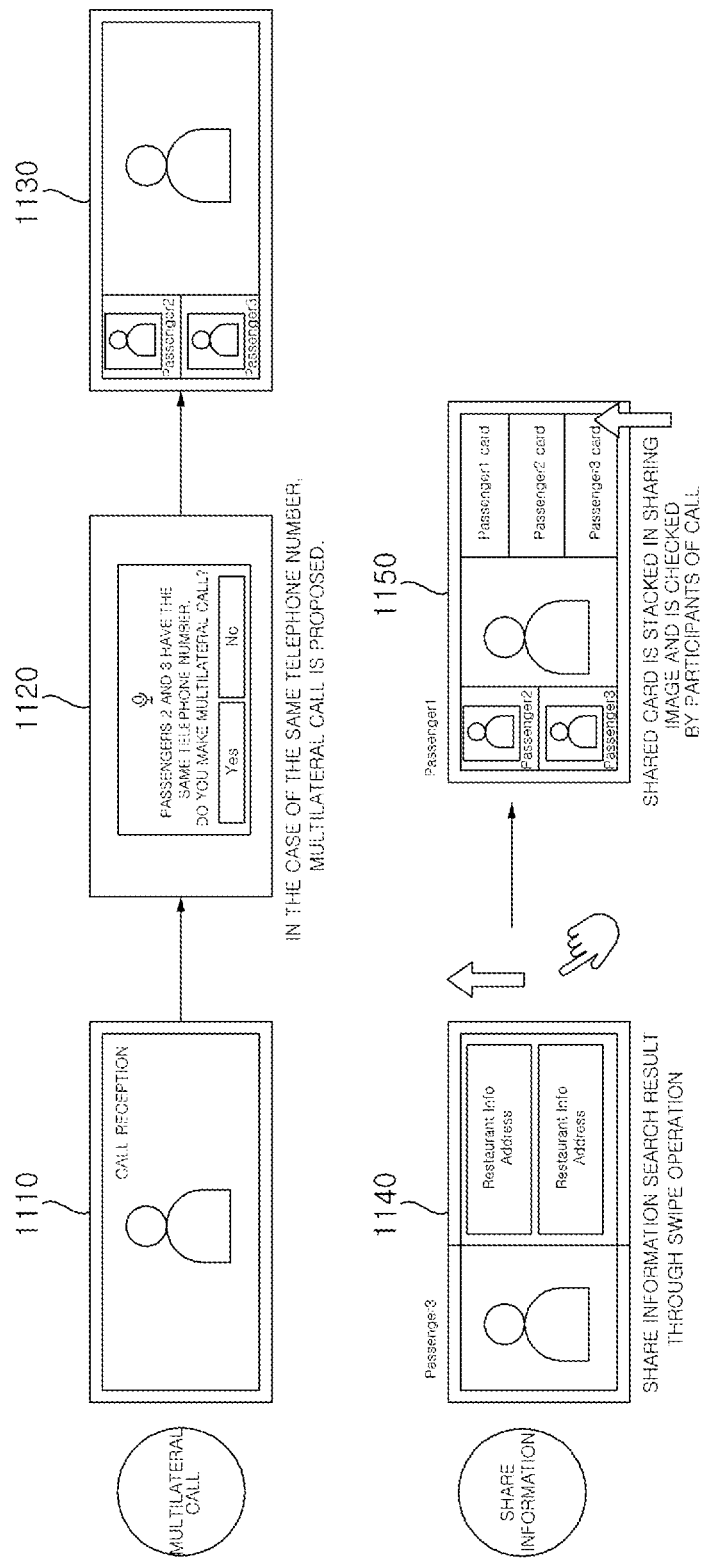

FIGS. 10 and 11 are diagrams for explanation of an operation of multilateral video telephony according to an embodiment of the present invention.

Referring to FIG. 10, the processor 170 may basically apply a personal mode during video telephony (S1010). Upon determining that the current state is a state in which a number of a terminal of a terminal is stored in a terminal of another user other than a user that is a subject of video telephony, the processor 170 may provide a multilateral call request signal. Upon receiving a response signal to the request signal, the processor 170 may convert a mode of video telephony to an open mode from a personal mode (S1020).

The processor 170 may share information retrieved through terminals (e.g., a smartphone, a tablet, or a vehicle system) of a plurality of users with each other during video telephony (S1030). The processor 170 may provide a function of sharing a destination, reserving a restaurant, or ordering food based on the shared information (S1040).

Referring to FIG. 11, upon receiving a call signal from a terminal of a counterpart, the processor 170 may display a call reception image 1110. The processor 170 may determine whether a number of a terminal of a counterpart is stored in a terminal of another user who rides in the vehicle 10. The processor 170 may output a message 1120 for checking whether multilateral video telephony is performed with a terminal of at least one user, which stores the number of the terminal of the counterpart. Upon receiving user input for accepting multilateral video telephony, the processor 170 may display an image 1130 for multilateral video telephony.

The second personal device may provide a signal for sharing search result information (1140). The first personal device may receive the search result information and may display the received information (1150). The first personal device may be a terminal that receives a call signal from a terminal of a counterpart, and the second personal device may be a terminal that proposes multilateral video telephony.

FIGS. 12 to 16 are diagrams for explanation of an operation for a video conference in a vehicle according to an embodiment of the present invention.

Figure 12:
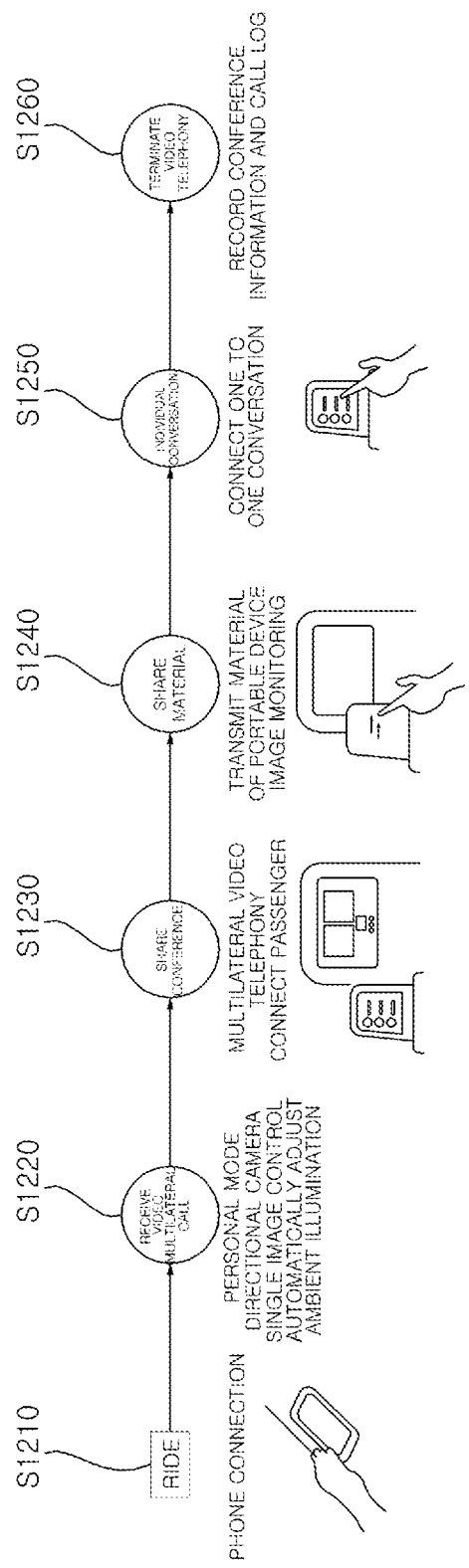

Referring to FIG. 12, as a user rides in the vehicle 10, the processor 170 may attempt synchronization with a terminal of the user (S1210). In a state in which the processor 170 is synchronized with the terminal of the user, the processor 170 may receive a video multilateral call from a terminal of a counterpart (S1220). In this case, the processor 170 may perform control to perform video telephony in a personal mode. The processor 170 may use a directional camera, may perform control to transmit a single image, and may automatically adjust ambient illumination. The processor 170 may attempt multilateral video telephony to connect with other passengers (S1230). When there is a request for sharing a material, the processor 170 may share the material (S1240). When there is a request for separate conversation, the processor 170 may perform control to do one to one conversation (S1250). When video conference is terminated, the processor 170 may record conference information and call log (S1260).

Referring to FIG. 13A, the processor 170 may receive a call signal of a request for external video conference from a terminal of a counterpart. The processor 170 may receive user input (e.g., swipe input) for sharing a conference with a passenger. In this case, the processor 170 may provide a signal for sharing a conference to another personal device except for a personal device that receives a call signal.

Referring to FIG. 13B, the processor 170 may receive data about a sharing material from a terminal carried by a user. The processor 170 may receive user input (e.g., swipe input) for sharing a material with a terminal and may transmit the sharing material to the electronic device 100. The processor 170 may display data on a display of a personal device.

Referring to FIG. 13C, the processor 170 may display a list of participants and a state of participants of the video conference. The state information of participants may be information on at least one of turn on, turn off, on line, off line, or sharing state of a device allocated to a participant. The processor 170 may receive user input (e.g., long tap) of a specific participant from the list of participants. In this case, the processor 170 may provide an image for one to one conversation with a corresponding participant.

Figure 14:
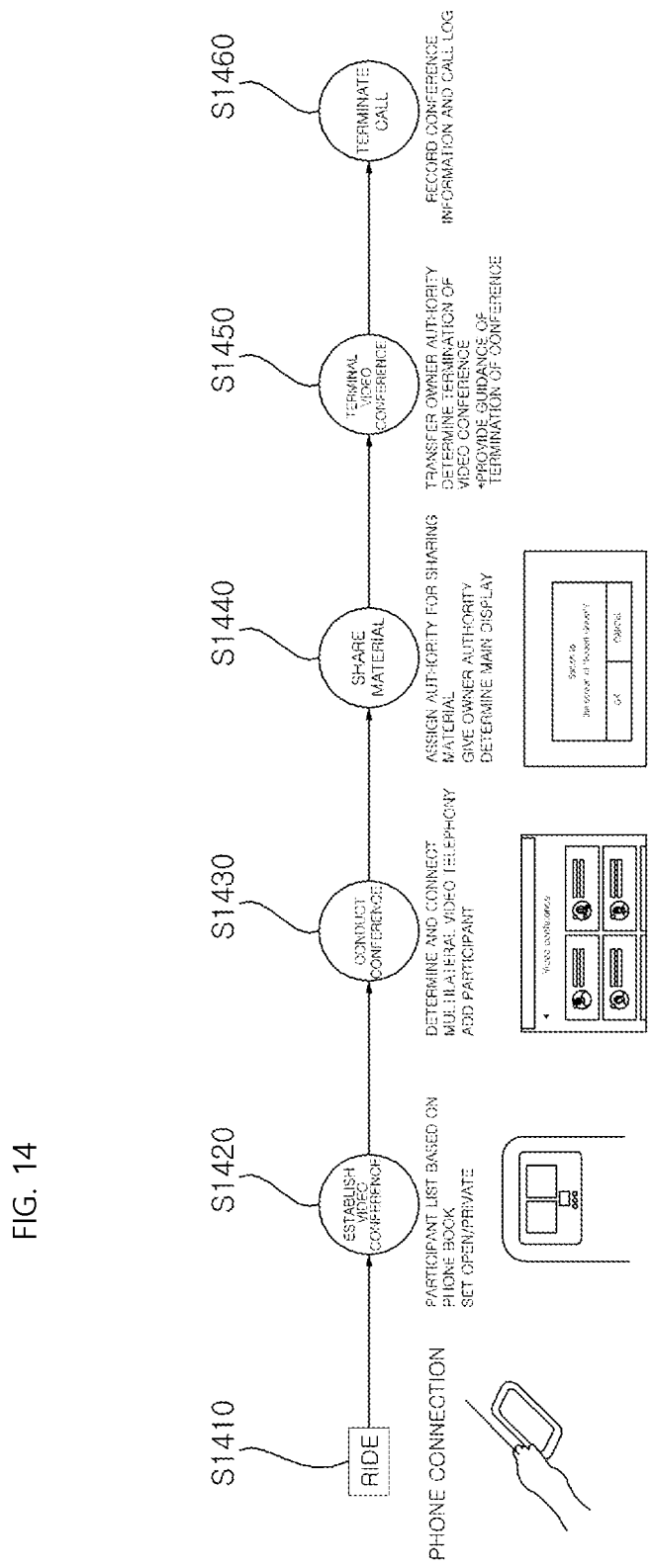

Referring to FIG. 14, as a user rides in the vehicle 10, the processor 170 may attempt synchronization with a terminal of the user (S1410). In a state in which the processor 170 is synchronized with the terminal of the user, the processor 170 may establish the video conference and may conduct a conference according to user input (S1420 and S1430). When there is a request of sharing a material, the processor 170 may share the material (S1240). When there is a request for termination of video conference, the processor 170 may terminate the video conference (S1450). When the video conference is terminated, the processor 170 may record conference information and call log (S1460).

Referring to FIG. 15A, the processor 170 may select a conference participant from an address lit and may establish a list of participants based on user input. The processor 170 may establish the video conference according to the established list.

Figure 15B:
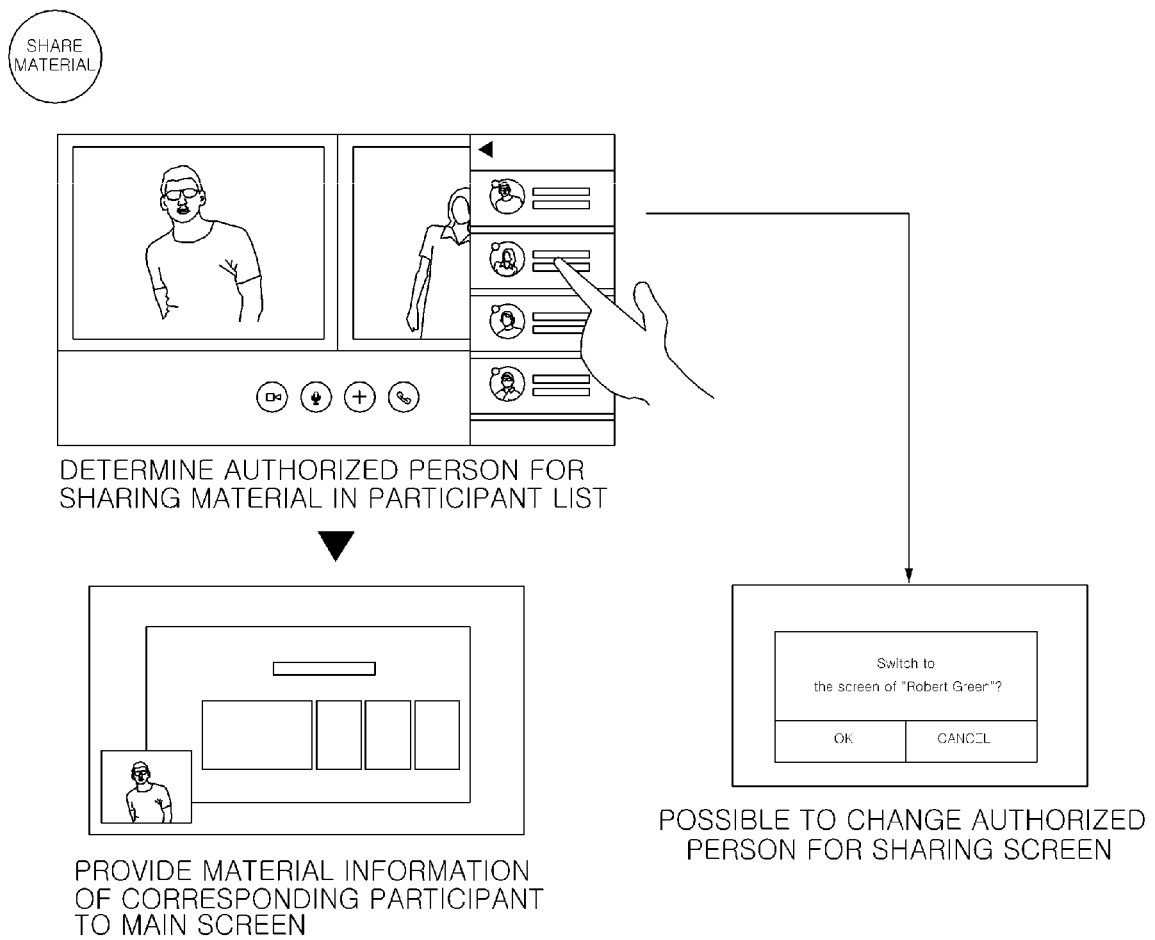

Referring to FIG. 15B, the processor 170 may determine an authorized person for sharing a material from the list of participants based on the user input. The processor 170 may provide material information of the authorized person for sharing to a main screen. The processor 170 may change an authorized person for sharing a screen.

Referring to FIG. 16, the processor 170 may record video conference. Upon receiving POS touch input on a lower end of an image, the processor 170 may output a queue for rewinding the recorded image. The processor 170 may select a portion of the recorded part according to the user input. The processor 170 may reproduce the selected recorded part.

FIGS. 17A to 18B are diagrams for explanation of video telephony within a sharing vehicle according to an embodiment of the present invention.

Referring to FIGS. 17A to 17B, the processor 170 may set a video telephony mode according to reservation information of the sharing vehicle. The processor 170 may set a personal mode or an open mode according to user settings when the sharing vehicle is reserved. The processor 170 may automatically set personal information such as a picture, telephone information, voice, or preferred sound, and information of a user terminal.

When a user alone rides in a vehicle, the processor 170 may set the personal mode and may not convert the mode to a video telephony mode. When a user with a passenger rides in the vehicle, the current mode may basically set to the personal mode, and video telephony may be shared with the passenger based on user input.

Figure 18A:
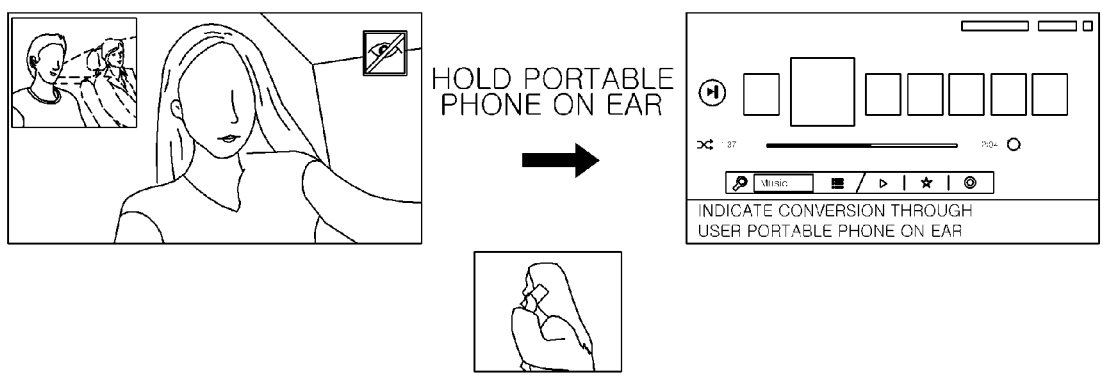

Referring to FIG. 18A, upon detecting an operation in which a user holds a user terminal on his or her ear during video telephony, the processor 170 may terminate video telephony. In this case, the user may use a voice call function through the user terminal. In this case, the user may use a voice call function through the user terminal. An operation of the user may be detected a cabin monitoring camera. The processor 170 may receive information on an operation of the user from the cabin monitoring camera.

Figure 18B:
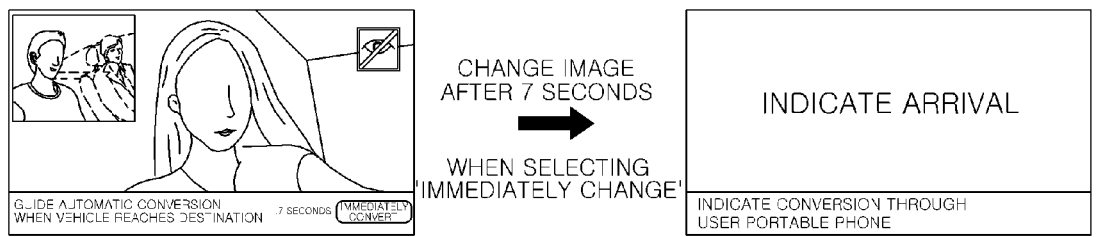

Referring to FIG. 18B, as a vehicle approaches a destination during video telephony, the processor 170 may provide information on a left time to the destination and a conversion button. When the vehicle reaches the destination, the processor 170 may automatically convert video telephony using a personal device to a call using the user terminal. Even before the vehicle reaches the destination, upon receiving user input through the conversion button, the processor 170 may convert the video telephony using a personal device to a call using the user terminal.

Figure 19:
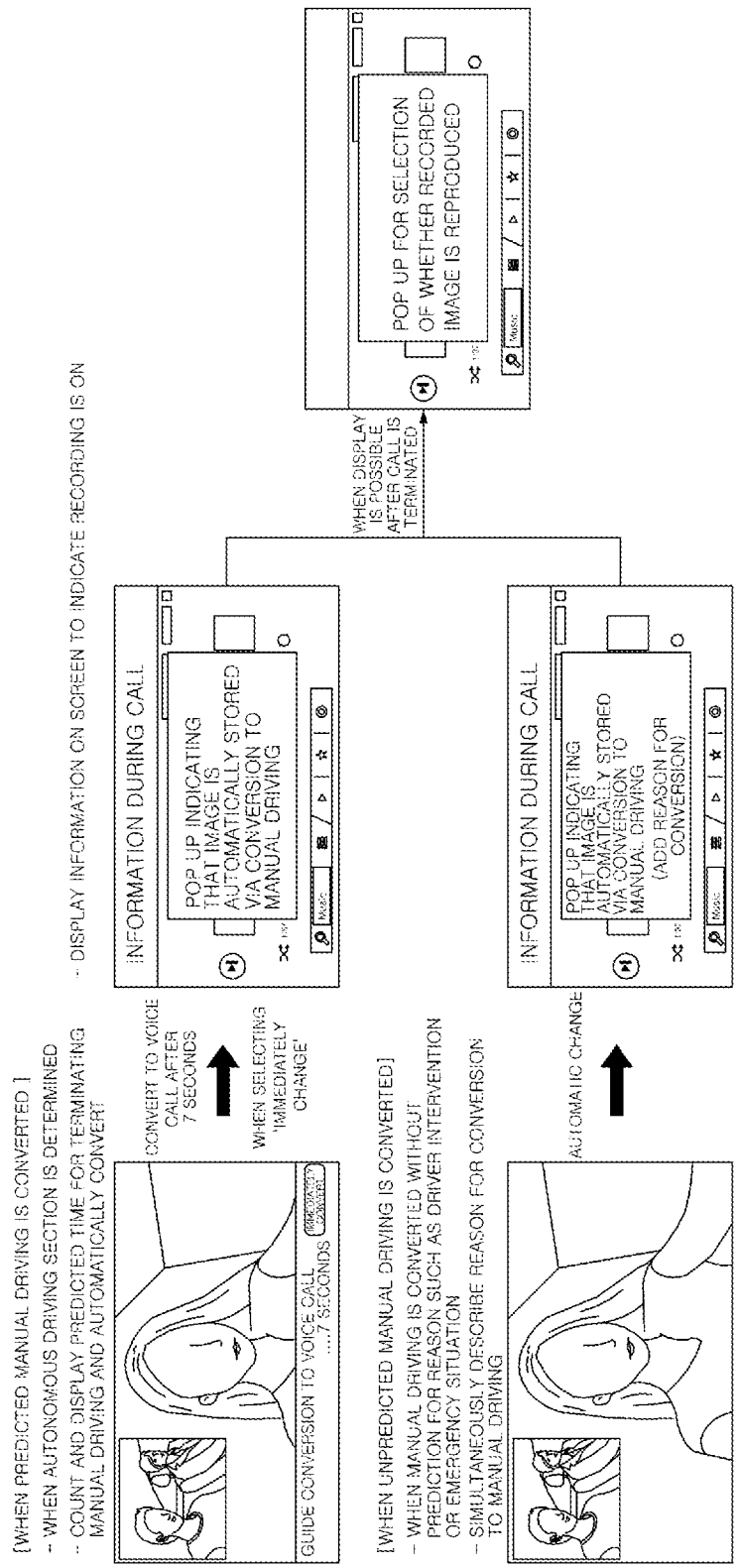

FIG. 19 is a diagram for explanation of an operation when a current mode is changed to a manual driving mode during video telephony according to an embodiment of the present invention.

Referring to FIG. 19, when the autonomous driving mode is converted to the manual driving mode, the processor 170 may convert video telephony to a voice call. In this case, the processor 170 may record an image. When the manual driving mode is converted to the autonomous driving mode, the processor 170 may convert the voice call to the video telephony. The processor 170 may reproduce a stored image according to user input.

When an autonomous driving section is determined, if the autonomous driving mode is converted to the manual driving mode according to a schedule, the processor 170 may count and display a predicted time for terminating autonomous driving. The processor 170 may convert video telephony to a voice call at a time point of conversion to the manual driving mode. After the current mode is converted to a voice call, the processor 170 may record an image.

In a state in which there is no prediction, when the autonomous driving mode is converted to the manual driving mode, the processor 170 may convert video telephony to a voice call. The processor 170 may output information on the reason for conversion to the manual driving mode. After conversion to a voice call, the processor 170 may record an image.

The invention can also be embodied as computer readable code on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), ROM, RAM, CD-ROM, magnetic tapes, floppy disks, optical data storage devices, etc. and include a carrier wave (for example, a transmission over the Internet). In addition, the computer may include a processor or a controller. Accordingly, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

DESCRIPTION OF REFERENCE NUMERAL

10: vehicle
100: vehicular electronic device
What is claimed:
1. A vehicular electronic device comprising:
a communicator configured to exchange a signal with a terminal of a user; and
a processor that is configured to:
receive information on a user gaze direction, determine whether the user gazes forward based on the information, perform control to make a call using voice only upon determining that the user gazes forward, and perform control to make a call using voice and an image upon determining that the user does not gaze forward, perform control to make (i) the call using voice only or (ii) the call using voice and an image, based on a signal received from the terminal, and upon receiving a first call signal transmitted from a terminal of a counterpart from a first terminal of a first user and receiving a second call signal transmitted from the terminal of the counterpart from a second terminal of a second user, perform control to make a multilateral call including the first user and the second user.

2. The vehicular electronic device of claim 1, wherein the processor is configured to perform control to make the call using voice only at a conversion stand-by time to an autonomous driving mode from a manual driving mode.

3. The vehicular electronic device of claim 1, wherein the processor is configured to perform control to make the call using voice and an image after conversion to an autonomous driving mode from a manual driving mode is completed.

4. The vehicular electronic device of claim 1, wherein the processor is configured to display a front image of a vehicle with a telephone image according to received information on an autonomous driving level, and display the front image including a larger amount of information as the autonomous driving level is lowered.

5. The vehicular electronic device of claim 1, wherein the processor is configured to perform control to make the call using voice only when a signal for conversion to a manual driving mode from an autonomous driving mode is generated.

6. The vehicular electronic device of claim 1,
wherein the processor is configured to activate a first personal device closest to the first terminal that receives the first call signal through the communicator among a plurality of personal devices included in a vehicle.

7. The vehicular electronic device of claim 6, wherein, upon determining that a telephone number included in the first call signal is stored in the second terminal, the processor is configured to further activate a second personal device closest to the second terminal.

8. An operation method of a vehicular electronic device, the method comprising:
receiving information on a user gaze direction, by at least one processor;
determining whether a user gazes forward based on the information, by the at least one processor;
upon determining that the user gazes forward, performing control to make a call using voice only;
upon determining that the user does not gaze forward, performing control to make a call using voice and an image;
performing control to make (i) the call using voice only or (ii) the call using voice and an image, based on a signal received from a terminal; and
upon receiving a first call signal transmitted from a terminal of a counterpart from a first terminal of a first user and receiving a second call signal transmitted from the terminal of the counterpart from a second terminal of a second user, performing control to make a multilateral call including the first user and the second user.

9. The method of claim 8, further comprising:
performing control to make the call using voice only at a conversion stand-by time to an autonomous driving mode from a manual driving mode, by the at least one processor; and
performing control to make the call using voice and an image after conversion to an autonomous driving mode from a manual driving mode is completed, by the at least one processor.

10. The method of claim 8, further comprising:
displaying a front image of a vehicle with a telephone image according to received information on an autonomous driving level, and displaying the front image including a larger amount of information as the autonomous driving level is lowered, by the at least one processor.

11. The method of claim 8, wherein the performing control to make the call using voice and an image includes activating a first personal device closest to the first terminal that receives the first call signal through a communicator among a plurality of personal devices included in a vehicle, by the at least one processor.

12. The method of claim 11, wherein the performing control to make the call using voice and an image includes, upon determining that a telephone number included in the first call signal is stored in the second terminal, further activating a second personal device closest to the second terminal, by the at least one processor.

13. The method of claim 8, further comprising performing image-processing on an image transmitted to a counterpart based on whether the call is in a personal mode or an open mode, by the at least one processor.

14. The method of claim 13, wherein the performing image-processing includes cropping or blurring a remaining part except for an utterer from the image transmitted to the counterpart when the call is in the personal mode.

15. The method of claim 14, further comprising, upon receiving a call join request signal, inactivating cropping or blurring, by the at least one processor.

* * * * *